United States Patent
Arndt et al.

(10) Patent No.: US 9,824,572 B2
(45) Date of Patent: Nov. 21, 2017

(54) SYSTEM, METHOD, AND COMPUTER PROGRAM PRODUCT FOR LOCATING LOST OR STOLEN ITEMS

(71) Applicants: Donald J Arndt, Menlo Park, CA (US); Chaia M May, Menlo Park, CA (US)

(72) Inventors: Donald J Arndt, Menlo Park, CA (US); Chaia M May, Menlo Park, CA (US)

(*) Notice: Subject to any disclaimer, the term of this patent is extended or adjusted under 35 U.S.C. 154(b) by 258 days.

(21) Appl. No.: 14/718,083

(22) Filed: May 21, 2015

(65) Prior Publication Data
US 2016/0343234 A1    Nov. 24, 2016

(51) Int. Cl.
*G06K 7/10*    (2006.01)
*H04B 7/26*    (2006.01)
*G08B 21/24*   (2006.01)

(52) U.S. Cl.
CPC ......... *G08B 21/24* (2013.01); *G06K 7/10366* (2013.01)

(58) Field of Classification Search
CPC .......... H04N 7/18; G08B 13/14; G08B 21/24; G06T 19/00
See application file for complete search history.

(56) References Cited

U.S. PATENT DOCUMENTS

| 6,259,367 B1 | 7/2001 | Klein |
| 7,420,465 B2 | 9/2008 | Ritter |
| 2009/0322537 A1* | 12/2009 | Tapp ................. G08B 13/19697 340/572.4 |
| 2013/0027556 A1* | 1/2013 | Clark ..................... G08B 21/24 348/148 |
| 2013/0346168 A1* | 12/2013 | Zhou ....................... G06F 1/163 705/14.4 |

FOREIGN PATENT DOCUMENTS

CN    203366507    12/2013

* cited by examiner

*Primary Examiner* — Sath V Perungavoor
*Assistant Examiner* — Patricia I Young
(74) *Attorney, Agent, or Firm* — Lincoln Law School of San Jose

(57) ABSTRACT

A system, method, and computer program product are provided for locating lost or stolen [BDS1] objects. In use, it is determined whether there are any RFID tags within a set range of a transceiver. If at least one RFID tag is determined, the at least one RFID tag is queried, and each of the at least one RFID tag is identified. Next, the identification of the at least one RFID tag is saved, and it is determined whether the RFID tag is no longer in a sensing zone. Additionally, a video is recorded, using at least one video camera, of the surroundings associated with the at least one RFID tag. Further, an audio is recorded, using at least one microphone, of the surroundings associated with the at least one RFID tag Next, the video recording and the audio recording are saved. Additionally, access to view the saved identification, the saved video recording, and the saved audio recording is provided. Additional systems, methods, and computer program products are also presented.

19 Claims, 10 Drawing Sheets

SYSTEM, METHOD, AND COMPUTER PROGRAM PRODUCT FOR LOCATING LOST OR STOLEN ITEMS

BACKGROUND

The present invention relates to locating objects, and more particularly to systems and methods for using RFID tags to locate objects.

Traditional location detection systems are generally limited by a number of factors, including power, distance, portability, and cost. One solution to such limitations is to use transceivers to detect objects at a short range. However, such a solution is greatly inhibited by the range of detection. For example, once a transceiver exceeds a set detectable distance from the object(s), the transceiver can no longer detect the object(s). As such, there is thus a need for addressing these and/or other issues associated with the prior art.

BRIEF SUMMARY

A system, method, and computer program product are provided for locating lost or stolen [BDS1] objects. In use, it is determined whether there are any RFID tags within a set range of a transceiver. If at least one RFID tag is determined, the at least one RFID tag is queried, and each of the at least one RFID tag is identified. Next, the identification of the at least one RFID tag is saved, and it is determined whether the RFID tag is no longer in a sensing zone. Additionally, a video is recorded, using at least one video camera, of the surroundings associated with the at least one RFID tag. Further, an audio is recorded, using at least one microphone, of the surroundings associated with the at least one RFID tag Next, the video recording and the audio recording are saved. Additionally, access to view the saved identification, the saved video recording, and the saved audio recording is provided. Additional systems, methods, and computer program products are also presented.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Not Applicable.

Drawings

Figure 1:
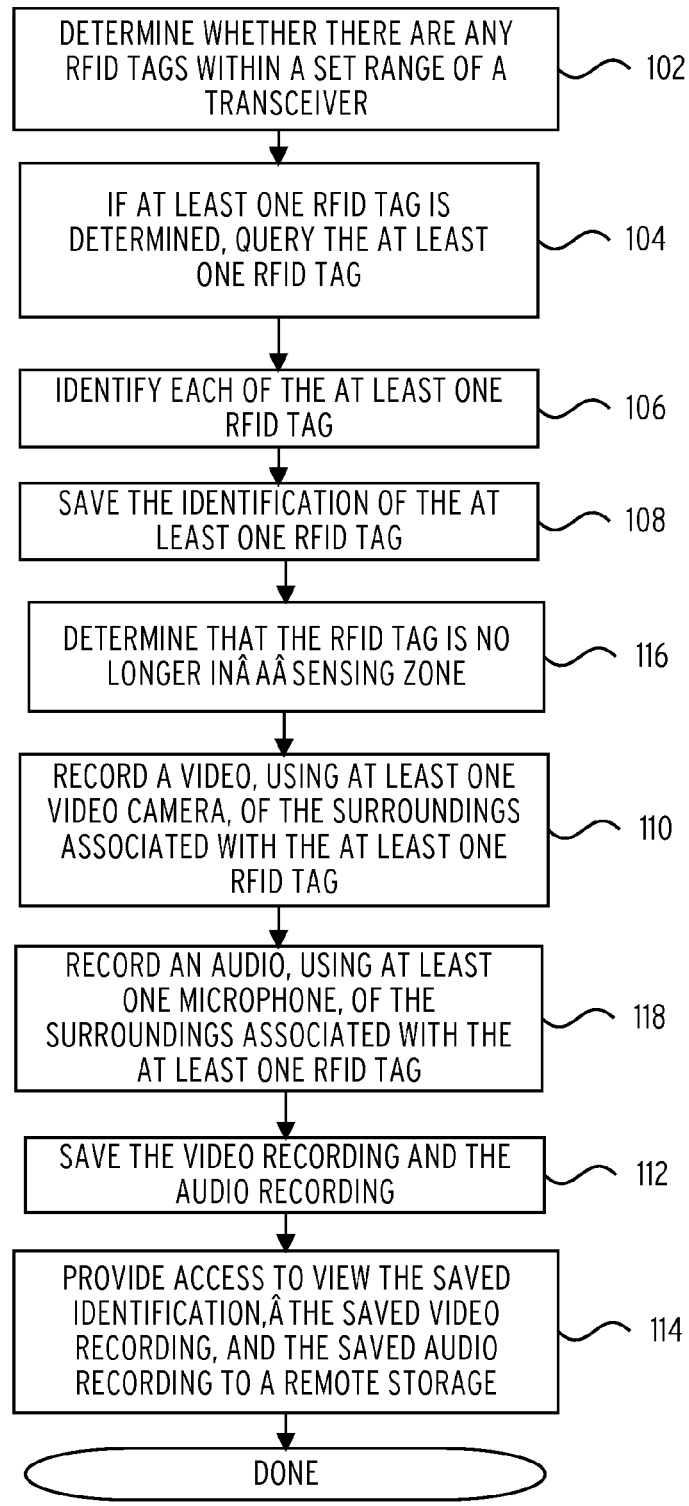
FIG. 1 illustrates an exemplary method for locating lost or stolen items, in accordance with one embodiment.

FIG. 1 illustrates an exemplary method for locating lost items, in accordance with one embodiment. As an option, the method may be carried out in the context of the details of any of the Figures disclosed herein. Of course, however, the method may be carried out in any desired environment. Further, any aforementioned definitions may equally apply to the description below.

In block 102, the routine determines using a processor, whether there are any Radio-frequency identification (RFID) tags within a set range of a transceiver. In the context of the present description, a RFID tag includes tag attached to an object which uses electromagnetic fields to transfer data. Additionally, in one embodiment, the RID tag may be passive. Further, in one embodiment, the transceiver may be associated with a user (e.g. via a bracelet, via a device, etc.).

In block 104, if the at least one RFID tag is determined, the at least one RFID tag is queried. In one embodiment, querying may include retrieving any information from one or more RFID tags. For example, the apparatus may be used to send out a query signal (e.g. pulse, etc.) to request a response from any RFID tag in the vicinity.

In one embodiment, vicinity may be limited by the strength of the transmitter and/or receiver and/or transceiver. In other embodiments, vicinity may be based on a predetermined threshold (e.g. less than 10 feet, etc.) associated with the apparatus.

In block 106, each of the at least one RFID tag is identified. In one embodiment, the identification may include a RFID identification number and/or any other information which may be used to identify the tag in some manner. For example, information may include location or GPS coordinates, date, owner, etc.

In block 108, the identification of the at least one RFID tag is saved. For example, such identification information may be saved in the memory associated with the apparatus.

In block 110, it is determined whether the RFID tag is no longer in a sensing zone. In one embodiment, a sensing zone may include a predetermined range around a user, a bracelet (detection device), and/or other object associated with the user which may communicate with the RFID tag in some manner. A sensing zone may include a set distance (e.g. 3-5 feet, etc.), may be based on GPS coordinates or a network signal strength (e.g. WiFi, Bluetooth, etc.), and/or may involve more than one sensing device. For example, in one embodiment, two or more bracelets may be used to detect RFID tags, and if one of them exits a predetermined range, the other bracelet may record information. If it is determined that a RFID tag has not left a sensing zone (or that a sensing device has left a sensing zone), then information is not yet recorded. If it is determined that a RFID tag (or that a sensing device) has left a sensing zone, then information may be recorded.

In block 112, a video is recorded using at least one video camera, the video including the surroundings associated with the at least one RFID tag. In various embodiments, the apparatus may include more than one video camera, as well as other recording modules, including audio, still photo camera, proximity sensor, light sensor, etc. In one embodiment, each of the recording modules may be used to record information associated with the at least one RFID tag (e.g. location, surroundings, audio of location of where RFID tag is located, etc.). In another embodiment, where more than one recording module is present, all or some of the recording modules may be used to record the video.

In block 114, an audio is recorded using at least one microphone, the audio including the surroundings associated with the at least one RFID tag. In various embodiments, the apparatus may include more than one microphone. Additionally, where more than one microphone is present, all or some of the microphones may be used to record the audio.

In block 116, the video recording and the audio recording are saved. In similar fashion to block 108, the video recording and audio recording may be saved in the memory associated with the apparatus.

In block 118, access to view the saved identification, the saved video recording, and the saved audio recording is provided. For example, in one embodiment, saved data associated with the apparatus may be uploaded to a cloud-computing location. In another embodiment, the uploading may include transferring the saved data in some manner from the apparatus to a mobile device (e.g. mobile phone, etc.). Additionally, in one embodiment, the saved identification, the saved video recording, and the saved audio recording may be viewed locally with an app via a second device with a display (e.g. PC, tablet, mobile device, phone, etc.).

In one embodiment, the uploading of the saved identification, the saved video recording, and the saved audio recording may occur in response to a request from a device (e.g. pc, mobile device, tablet, etc.), from a user (e.g. via a device, etc.), from the cloud (e.g. request updates from the sensing device, etc.), etc.

In some embodiments, a computing apparatus may include a processor and a memory storing instructions that, when executed by the processor, configure the apparatus to perform a method which may include determining whether there are any RFID tags within a set range of the transceiver; if at least one RFID tag is determined, querying the at least one RFID tag; identifying each of the at least one RFID tag; saving the identification of the at least one RFID tag; recording, using at least one video camera, the surroundings associated with the at least one RFID tag; saving the video recording; and/or uploading the saved identification and the saved video recording to a remote storage.

In some embodiments, such a apparatus may further include two or more video cameras. Additionally, in other embodiments, one video camera is selected among the two or more video cameras to record. In a further embodiment, one video camera may be selected based on at least one of an accelerometer, a gyroscope, one or more proximity sensors, and one or more photodetectors. In some embodiments, two video cameras are selected to record.

Still yet, in one embodiment, such a apparatus may further include recording, using at one audio input, sounds associated with the environment around the at least one RFID tag, saving the audio recording, and uploading the saved audio recording to the remote storage.

In some embodiments, the remote storage may include storage located in the cloud. In other embodiments, the uploading may occur automatically after a new saved identification or saved video recording is completed. For example, in one embodiment, once a saved identification or saved video is finished being recorded, it may immediately try to connect to the cloud to be uploaded. If the cloud cannot be accessed (e.g. it is out of range of internet signal, etc.), the apparatus will continue to seek (e.g. at set intervals, once every 10 minutes, etc.) to upload the new saved identification or saved video until it is actually uploaded.

In one embodiment, if the apparatus is unable to upload the new saved identification or saved video (e.g. lack of internet connection, etc.), and if the apparatus comes within the vicinity of a RFID tag, the newer saved video will replace the previously stored video recording.

In various embodiments, the apparatus may save two prior recordings associated with a RFID tag. Of course, in other embodiments, the number of prior recordings to be saved may be set by the user and/or be dependent upon the amount of storage space available in the apparatus.

In some embodiments, such a apparatus may further include communicating with an external device. For example, in embodiment, an external device may include a mobile phone, tablet, laptop, computer, and/or any other device which is capable of communicating with a RFID tag.

In some embodiments, the communicating may include receiving instruction from the external device to pair with the at least one RFID tag. For example, in one embodiment, the apparatus may be used to detect a RFID tag. When a RFID tag is detected, the apparatus may notify the external device of the detected RFID tag. If the tag was previously identified and paired in some manner with the apparatus, then the information displayed on the external device may include the name of the object associated with the RFID tag, the location of the tag, the last known time it was identified, etc. If the tag was not previously identified, then the information displayed on the external device may include a prompt "Would you like to pair the apparatus with the detected RFID tag?" Of course, any prompt may be displayed requesting some input.

In other embodiments, the apparatus may be used to automatically register and pair new RFID tags.

In some embodiments, the communicating may include sending the saved identification or the saved video recording to the external device. For example, in one embodiment, the external device may be within a set distance (e.g. 3-5 feet, etc.) of the apparatus, and based on the distance, the apparatus may send to the external device the saved identification or the saved video recording. In other embodiments, the external device may not be within the set distance of the apparatus. In such an embodiment, the apparatus may immediately upload the data to the cloud, and once it is uploaded, the cloud may then be used to send the data to the external device, regardless of its location. Of course, in another embodiment, the cloud may send a notification, and/or any other information to the external device, to notify it of new data associated with the apparatus.

Further yet, in one embodiment, the apparatus may interact with more than one external device, multiple networks, and/or multiple services in the cloud.

In some embodiments, the determining of whether there are any RFID tags within a set range of the transceiver may occur at a set time intervals. For example, in one embodiment, the apparatus may send out pulse once every 30 seconds, 1 minute, and/or any other predefined time period. In some embodiments, the time interval may be once every three minutes.

In some embodiments, the determining may occur based on GPS coordinates. For example, in one embodiment, if the GPS coordinates are rapidly changing (e.g. the user is in a car, etc.), the period for determining if any RFID tags may change (e.g. decrease because the apparatus may be stationary in a vehicle, increase because the apparatus may be affixed to a user who is running, etc.). Of course, the time threshold for determining if any RFID tags are near may be predefined in any manner as desired by the user.

Figure 2:
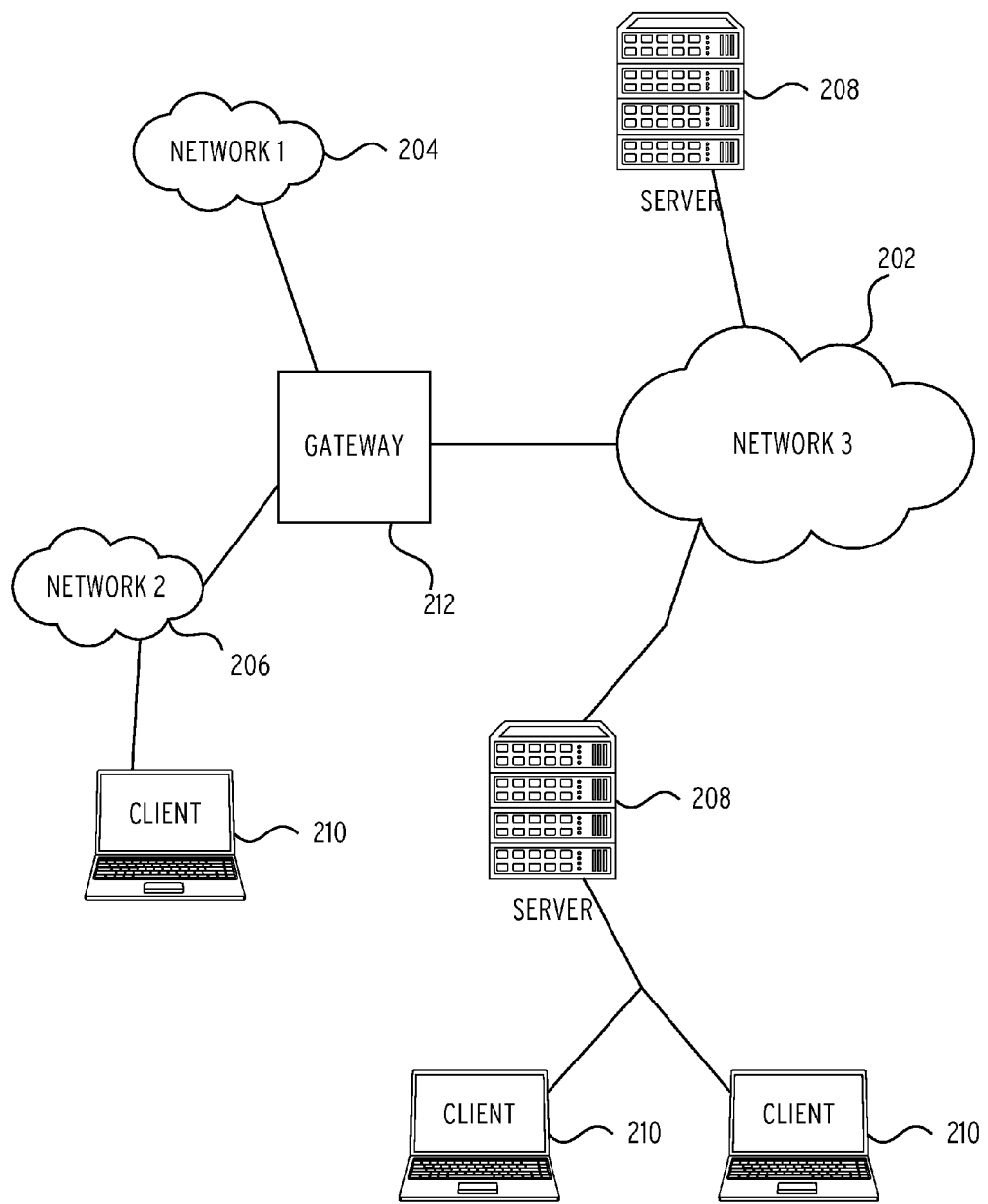
FIG. 2 illustrates a network architecture, in accordance with one embodiment.

FIG. 2 illustrates a network architecture, in accordance with one embodiment. As shown, a plurality of networks, Network 1 204, Network 2 206, and Network 3 202, are provided. In the context of the present network architecture, the networks, Network 1 204, Network 2 206, and Network 3 202 may each take any form including, but not limited to a local area network (LAN), a wireless network, a wide area network (WAN) such as the Internet, peer-to-peer network, etc. Additionally, such networks may include a RFID communication between Client 210 and another device (e.g. wearable, cloud, tag, etc.). Further, such networks may include any peer to peer (P2P) or device to device communication.

[BDS1] This is to be clear that the network system may include P2P or device to device type communication Coupled to the Network 3 202 are one or more Server 208 which are capable of communicating over the Network 3 202, as well as any other applicable network (e.g. Network 1 204, Network 2 206, etc.). Also coupled to Network 2 206 and Network 3 202 (or any other applicable network) and the Server 208 is a plurality of Client 210. Such Server 208 and/or Client 210 may each include a desktop computer, lap-top computer, hand-held computer, mobile phone, portable device, personal digital assistant (PDA), peripheral (e.g. printer, etc.), any component of a computer, and/or any other type of logic. In order to facilitate communication among Network 1 204, Network 2 206, Network 3 202, and/or any other network, at least one Gateway 212 is optionally coupled therebetween. In the context of the present description, cloud refers to one or more servers, services, and/or resources which are located remotely.

Figure 3:
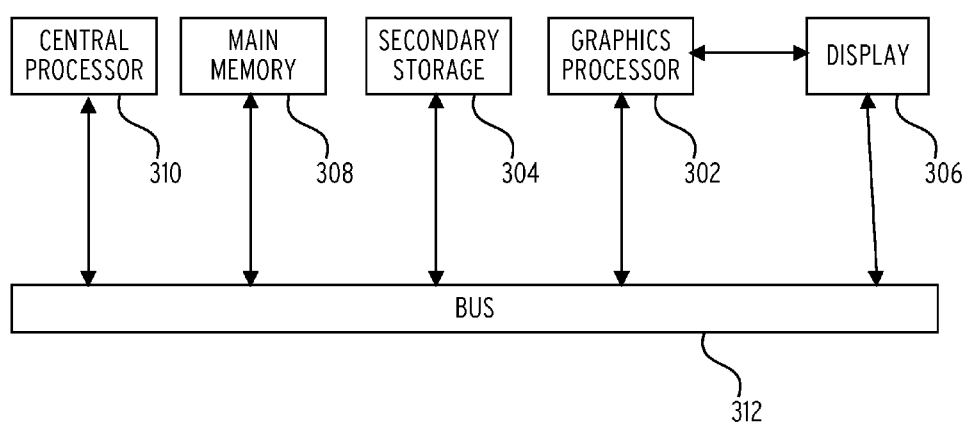
FIG. 3 illustrates an exemplary system in which the various architecture and/or functionality of the previous embodiment and/or subsequent embodiments may be implemented.

FIG. 3 illustrates an exemplary system in which the various architecture and/or functionality of the previous embodiment and/or subsequent embodiments may be implemented. As shown, a system is provided including at least one host Central Processor 310 which is connected to a Communication Bus 312. The system also includes a Main Memory 308. Control logic (software) and data are stored in the Main Memory 308 which may take the form of random access memory (RAM).

The system also includes a Graphics Processor 302 and a Display 306, i.e. a computer monitor. In one embodiment, the Graphics Processor 302 may include a plurality of shader modules, a rasterization module, etc. Each of the foregoing modules may even be situated on a single semiconductor platform to form a graphics processing unit (GPU).

The system may also include a Secondary Storage 304. The Secondary Storage 304 includes, for example, at least one of a non-volatile memory (e.g. flash memory, magnetoresistive memory, ferroelectric memory, etc.), a hard disk drive, and a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the Main Memory 308 and/or the Secondary Storage 304. Such computer programs, when executed, enable the system to perform various functions. The Main Memory 308, the Secondary Storage 304 and/or any other storage are possible examples of computer-readable media.

In one embodiment, the architecture and/or functionality of the various previous figures may be implemented in the context of the host Central Processor 310, Graphics Processor 302, an integrated circuit (not shown) that is capable of at least a portion of the capabilities of both the host Central Processor 310 and the Graphics Processor 302, a chipset (i.e. a group of integrated circuits designed to work and sold as a unit for performing related functions, etc.), and/or any other integrated circuit for that matter.

Additionally, the architecture and/or functionality of the various previous figures may be implemented in the context of a general computer system, a circuit board system, a game console system dedicated for entertainment purposes, an application-specific system, and/or any other desired system. For example, the system may take the form of a desktop computer, a laptop computer, a server computer, and/or any other type of logic. Still yet, the system may take the form of various other devices including, but not limited to, a personal digital assistant (PDA) device, a mobile device, a tablet device, a television, etc. In the context of the present description, a mobile device may include any portable computing device, including but not limited to, a laptop computer, a tablet computer, a desktop computer, a mobile phone, a media player, a camera, a television, and/or any other portable computing device.

Further, while not shown, the system may be coupled to a network (e.g. a telecommunications network, local area network (LAN), wireless network, wide area network (WAN) such as the Internet, peer-to-peer network, cable network, etc.) for communication purposes. As an example, any of the Network 1 204, Network 2 206, and/or Network 3 202 may be used for such coupling.

Of course, the various embodiments set forth herein may be implemented utilizing hardware, software, or any desired combination thereof. For that matter, any type of logic may be utilized which is capable of implementing the various functionality set forth herein.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
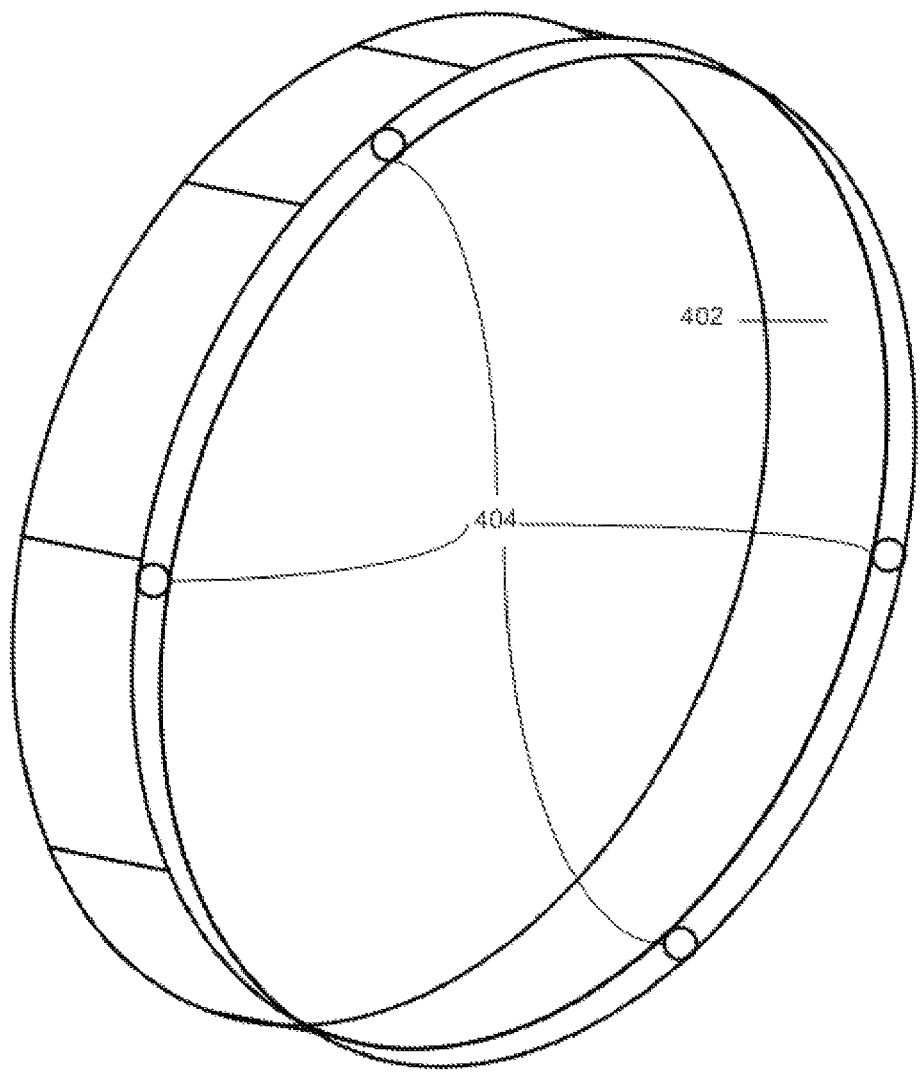
FIG. 4 is an exemplary apparatus for querying local RFID tags and recording when object becomes out of range of user wear-able device

FIG. 4 is an exemplary apparatus for querying local RFID tags and recording when object becomes out of range of user wear-able device, in accordance with one embodiment. As an option, the apparatus may be carried out in the context of the details of any of the Figures disclosed herein. Of course, however, the apparatus may be used in any desired environment. Further, any aforementioned definitions may equally apply to the description below.

As shown, bracelet apparatus 402 includes multiple video cameras 404. In various embodiments, the video cameras may be located on the side of the bracelet apparatus, on the outward face of the bracelet apparatus, and/or any other location on the bracelet apparatus.

In various embodiments, other apparatuses may be used in place of a bracelet, including a broach, necklace, watch, and/or any other wearable device. In such embodiments, the placement of the video cameras may be on any face of the device.

In one embodiment, it may be beneficial to have multiple cameras, as one or more camera may not have a clear view of the surroundings. As such, the multiple cameras may be configured such that the camera with the clearest view (e.g. without obstruction, etc.) is given priority when recording.

In another embodiment, the bracelet apparatus may include one or more microphones, and/or one or more speakers. In this manner, the device may be able to both record audio and play sounds.

In one embodiment, the bracelet apparatus may include a rechargeable battery which may be wirelessly recharged (e.g. inductive charging, etc.).

Figure 5:
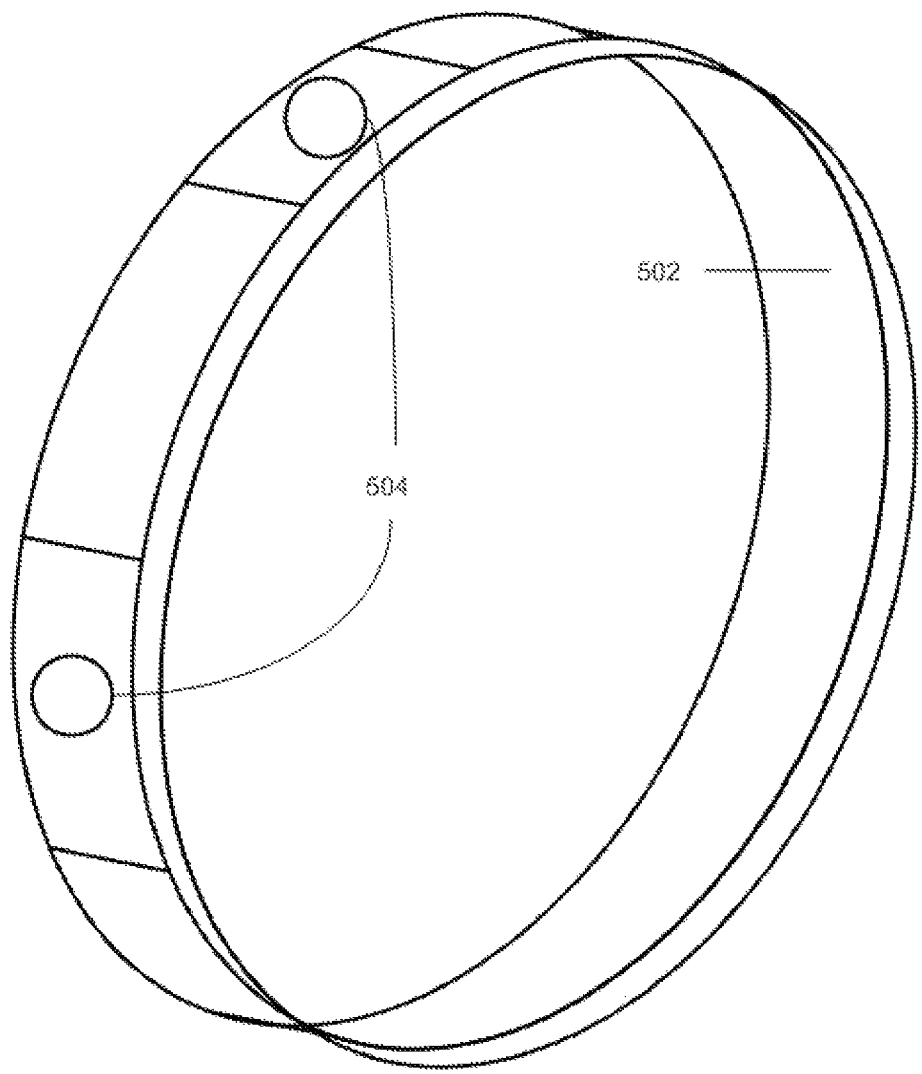
FIG. 5 is an exemplary apparatus for querying local RFID tags and recording when object becomes out of range of user wear-able device, in accordance with one embodiment.

FIG. 5 is an exemplary apparatus for querying local RFID tags and recording when object becomes out of range of user wear-able device, in accordance with one embodiment. As an option, the apparatus may be carried out in the context of the details of any of the Figures disclosed herein. Of course, however, the apparatus may be used in any desired environment. Further, any aforementioned definitions may equally apply to the description below.

As shown, bracelet apparatus 502 includes multiple video cameras 504. In various embodiments, the video cameras may be located on the side of the bracelet apparatus, on the outward face of the bracelet apparatus, and/or any other location on the bracelet apparatus.

The description of bracelet apparatus 402 applies equally to bracelet apparatus 502.

Figure 6:
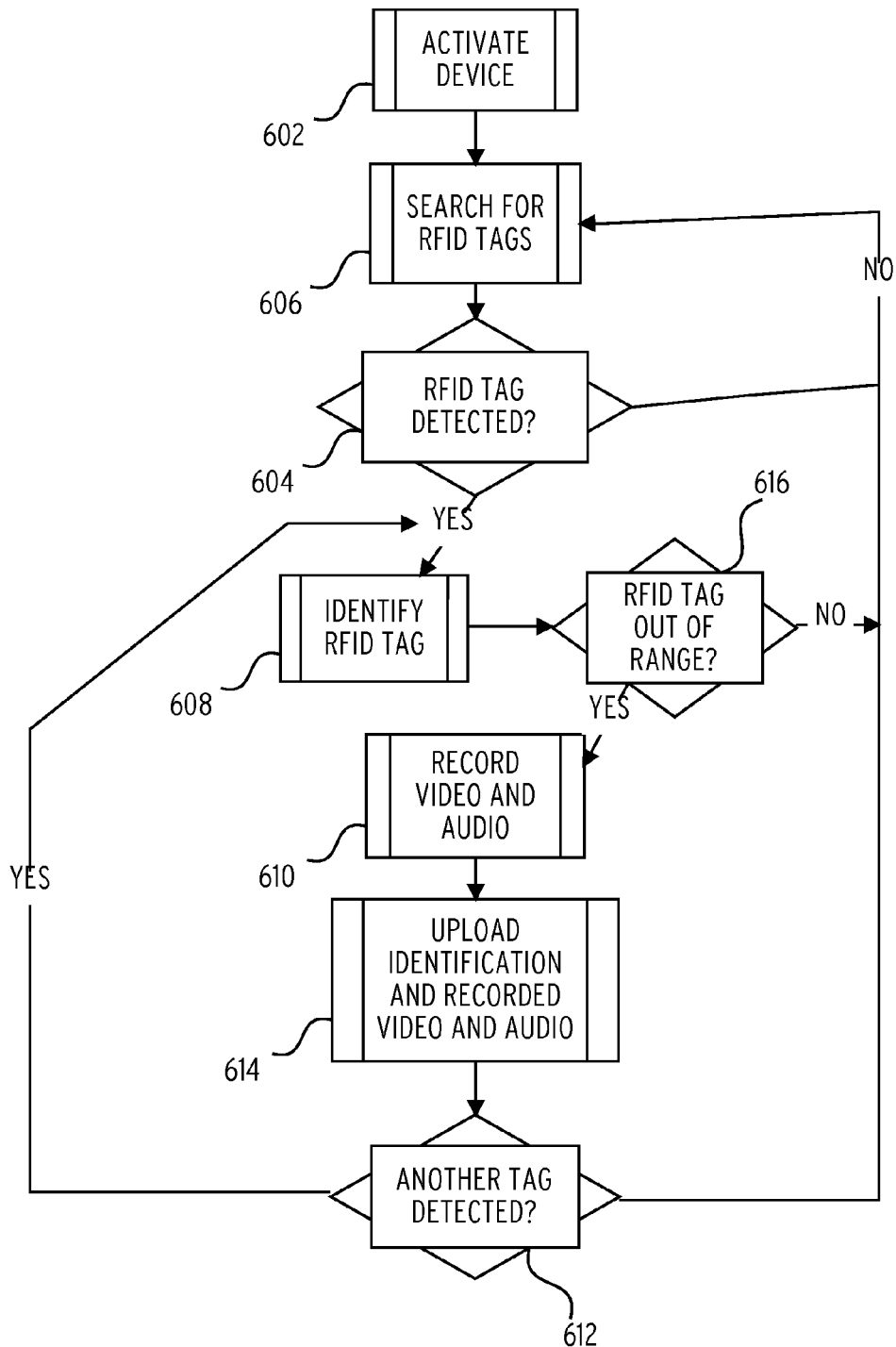
FIG. 6 illustrates a method for uploading identification and recorded video and audio, in accordance with one embodiment.

FIG. 6 illustrates a method for uploading identification and recorded video and audio, in accordance with one embodiment. As an option, the method may be carried out in the context of the details of any of the Figures disclosed herein. Of course, however, the method may be carried out in any desired environment. Further, any aforementioned definitions may equally apply to the description below.

As shown, a device is activated. See operation 602. Additionally, the device searches for RFID tags. See operation 604. Next, it is determined whether a RFID tag is detected. See decision 606.

In one embodiment, the determination may occur at set time intervals (e.g. once every few minutes, etc.), based on GPS coordinates (e.g. a change of coordinates may trigger a scan of RFID tags, etc.), based on a manual input (e.g. forced scan based on input from user, etc.), etc.

In another embodiment, when a RFID tag is detected, the device may give a notification (e.g. vibrate, audible noise, etc.) to indicate a RIFD tag has been detected. Of course, in other embodiments, the user may select how notification occur.

As shown, if a RFID tag is detected, the RFID tag is identified. See operation 608. In one embodiment, if the RFID tag had not been previously identified, the identification may include storing a device id or some other identification to identify the RFID tag. In another embodiment, if the RFID tag was previously identified, then RFID tag's information (i.e. the identification, etc.) may be retrieved.

Once a RFID tag is identified, it is then determined whether the RFID tag goes out of range. See decision 610. If a RFID tag is not out of range, then the process resumes with searching for RFID tags. See operation 604.

If a RFID tag does go out of range, then the device may then record video and audio. See operation 612. For example, in one embodiment, once a RFID tag is detected and identified, then the device may record a set video length (e.g. 5 seconds, 7 seconds, 10 seconds, etc.) of the surroundings associated with the RFID tag. Additionally, in one embodiment, the device may record a set audio length (e.g. 5 seconds, 7 seconds, 10 seconds, etc.) of the environment associated with the RFID tag.

In some embodiments, multiple video feeds may be used to capture the surroundings from different angles on the device. In such an embodiment, viewing multiple video feeds (after recording) may enable a more quick and efficient identification of the location of the object. In this manner, video and/or audio associated with the RFID tag may be played back at a later time period to assist in identifying the location of the RFID tag (i.e. the object including the RFID tag, etc.).

As shown, the identification and recorded video and audio are uploaded. See operation 614. As discussed herein, the uploading may be to the cloud and/or to another external device.

Further, it is determined whether another tag is detected. See decision 616. If another tag is detected, then the method proceeds to operation 608. If another tag is not detected, then the method proceeds to operation 604.

In one embodiment, such a method may be useful for finding lost objects. In other embodiments, such a method may be useful in retrieving stolen items, assisting in asset management, etc.

In various embodiments, the RFID tags may be configured (e.g. flat, small, etc.) such that they can be affixed to any object.

Still yet, in one embodiment, when the device searches for RFID tags (e.g. Operation 604, etc.), the device must be within a set proximity of the RFID tags (i.e. so that the device can transmit a pulse and receive a response, etc.). After receiving information associated with the RFID tag, however, such information may be used to locate the RFID tag, notwithstanding any distance between the device and the RFID tag.

For example, in one embodiment, a user may wear a bracelet device to identify objects associated with the user. While walking through the user's house, the bracelet may automatically record the environment (e.g. video stream, audio stream, etc.) whenever a RFID tag is detected which subsequently exits a user's immediate zone/area (e.g. 3-5 feet, etc.). At a later time period, the user may indicate that an object cannot be located. As such, the user may retrieve (e.g. via the user-wearable device to a local PC, portable device, tablet device, the cloud, etc.) the video and audio recordings (e.g. which were previously uploaded, etc.) to determine where the lost object was last identified when leaving the sensing area/zone.

Of course, the above example is intended merely as one example of how such a method may be applied and should not be limiting in any manner.

Figure 7:
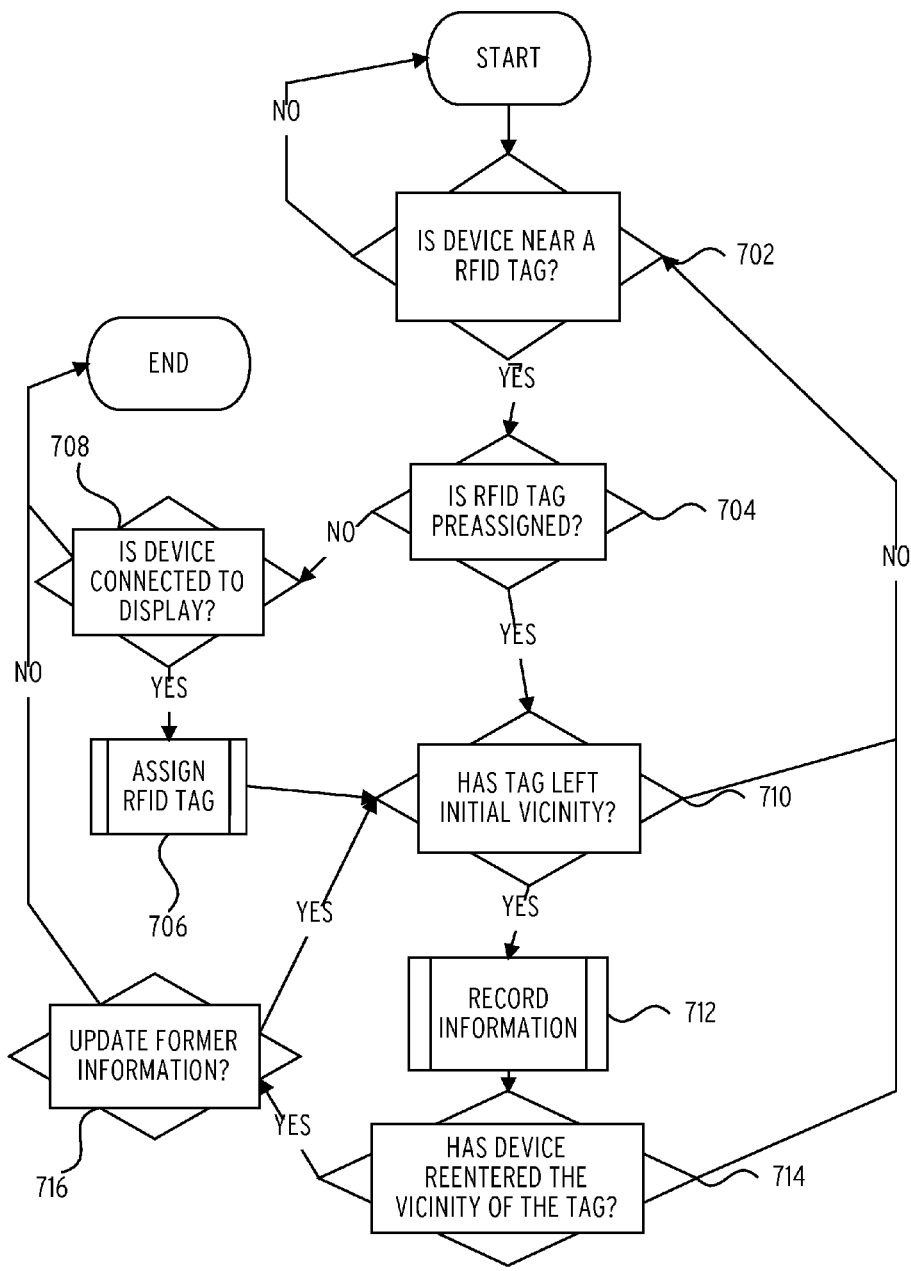
FIG. 7 illustrates a method for recording information for RFID tags, in accordance with one embodiment.

FIG. 7 illustrates a method for recording information for RFID tags, in accordance with one embodiment. As an option, the method may be carried out in the context of the details of any of the Figures disclosed herein. Of course, however, the method may be carried out in any desired environment. Further, any aforementioned definitions may equally apply to the description below.

As shown, it is determined if a device is near a RFID tag. See decision 702. If it is determined that a device is not near a RFID tag, then the device continues to determine if a device is near a RFID tag. If it is determined that a device is near a RFID tag, then it is determined if the RFID tag is preassigned. See decision 704. For example, in one embodiment, preassigned may include pairing the RFID tag with the device in some manner.

If it is determined that a RFID tag is not preassigned, it is determined if a device is connected to a display. See decision 708. If a device is not connected to a display, then the process ends.

In a separate embodiment, if a RFID tag is not preassigned, the device may be configured to accept and/or automatically pair with new RFID tags. Of course, the association between the device and RFID tags may be set up in any manner as desired by the user.

If a device is connected to a display (e.g. on an external device, mobile phone, etc.), then a prompt to assign a RFID tag is displayed. See operation 706.

If a RFID tag is preassigned, and once a RFID tag is assigned, it is determined if the tag (RFID tag) has left the initial vicinity. See decision 710. If it is not determined that the tag has left the initial vicinity, then the device does not record the surroundings and proceeds forward with searching for other RFID tags. See decision 702.

In one embodiment, even if the tag has not left the initial vicinity, the device may still record a new recording (e.g. the surroundings may have changed since the prior recording, etc.).

If it is determined that the tag has left the initial vicinity, then information is recorded. See operation 712. For example, video, audio, GPS coordinates, and/or any other relevant information associated with the RFID tag may be recorded. Additionally, in one embodiment, video and audio associated with the environment where the tag is located may be recorded. In one embodiment, previously recorded information may be erased when new information is recorded. Or, in another embodiment, information recorded may be archived (e.g. the prior two, or any number, location information may be saved, etc.).

Next, it is determined if the device has reentered the vicinity of the tag. See decision 714. If it determined that the device has not reentered the vicinity of the tag, then the device proceeds forward with searching for other RFID tags. See decision 702.

If it is determined that the device has reentered the vicinity of the tag, then it is determined whether to update the former information. See decision 716. For example, in one embodiment, if the device has recorded the surroundings associated with the tag within the past 24 hours, then the former information may not need to be updated. As such, the amount of time since the last information was collected may trigger whether new information and data is collected.

If it is determined to update former information, then the process proceeds back to determining whether the tag has left the initial vicinity. See decision 710. If it determined to not update former information, then the process ends.

In one embodiment, updating former information may include erasing prior information associated with the tag. In this manner, the information saved may only reflect the most recently received information associated with the RFID tag.

Figure 8:
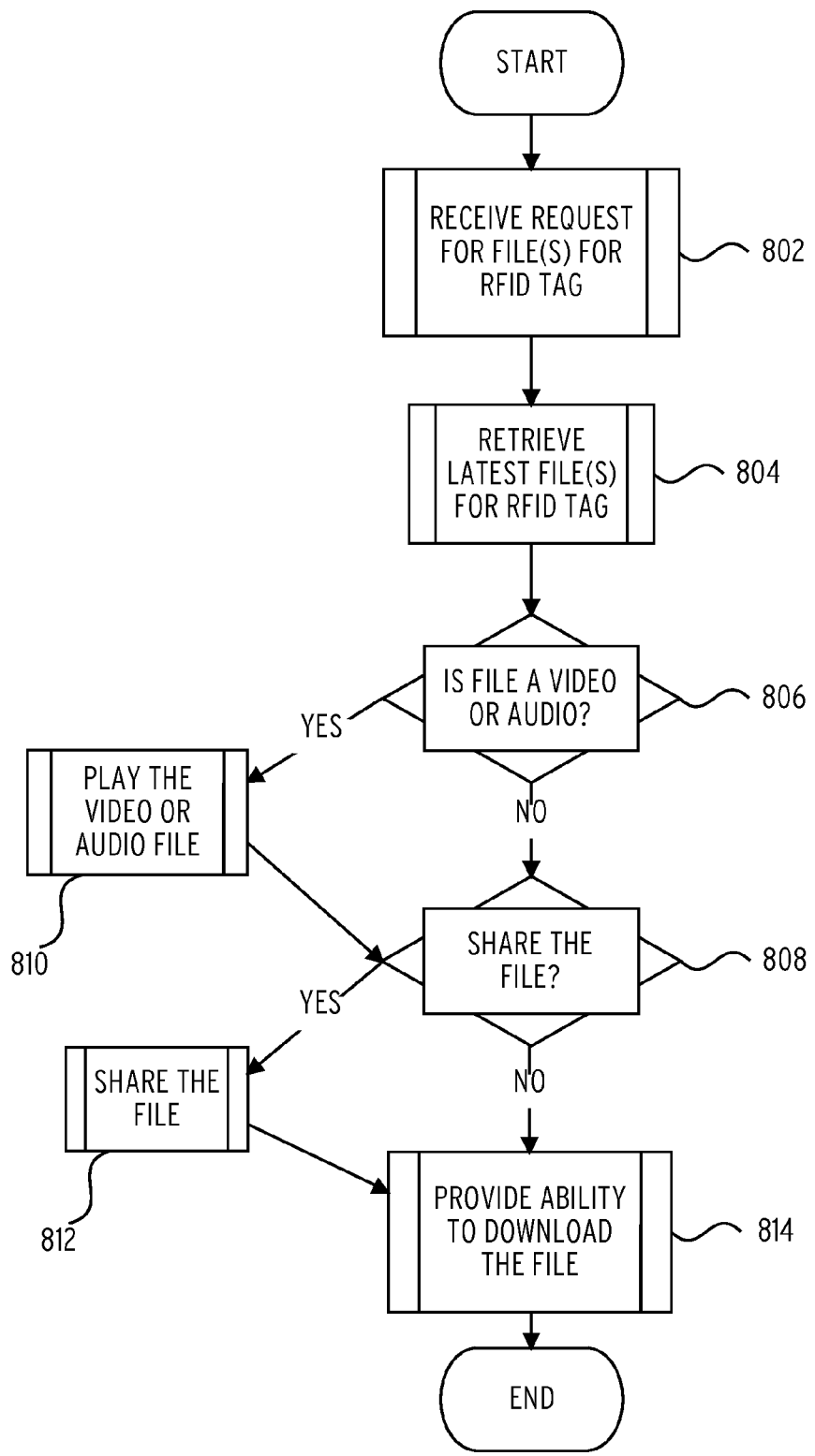
FIG. 8 illustrates a method for sharing files associated with a RFID tag, in accordance with one embodiment.

FIG. 8 illustrates a method for sharing files associated with a RFID tag, in accordance with one embodiment. As an option, the method may be carried out in the context of the details of any of the Figures disclosed herein. Of course, however, the method may be carried out in any desired environment. Further, any aforementioned definitions may equally apply to the description below.

As shown, a request for file(s) for a RFID tag is received. See operation 802. Additionally, the latest file(s) for the RFID tag are retrieved. See operation 804.

In various embodiment, one or more files may be associated with a RFID tag. For example, files may include video recordings, audio recordings, GPS coordinates, and/or any other data. Additionally, the latest file(s) may include that which was last uploaded to the cloud (or any other external device).

As shown, it is determined whether a file is a video or an audio. See decision 806. If it is determined that the file is a video or an audio, then a prompt to play the video or audio file is displayed. See operation 808.

If it is determined that the file is not a video or an audio, or if the prompt to play the video or audio file has been completed (i.e. a user selected to play or not play the video or audio file, etc.), then it is determined whether to share the file. See decision 810. If it determined to share the file, then the file is shared.

In one embodiment, sharing the file may include sending metadata associated with the file (e.g. time stamp of most recent changes, etc.), sending a link to the file (e.g. "Click here to view latest environment associated with Object [x]", etc.), sending the actual file (e.g. the uploaded video or audio recording, etc.), and/or sending any other information associated with the file.

If it determined to not share the file (or after it the file is shared in some manner), then an ability to download the file is provided. For example, in one embodiment, the user may wish to download the files and share them in some other manner (e.g. email, etc.).

Of course, in other embodiments, the order in which the features are presented (e.g. play file, share file, download file, etc.) may occur in another manner other than that which is presented here. For example, in one embodiment, once the latest files are retrieved, an ability to play, share, and/or download the files immediately may be presented.

Figure 9:
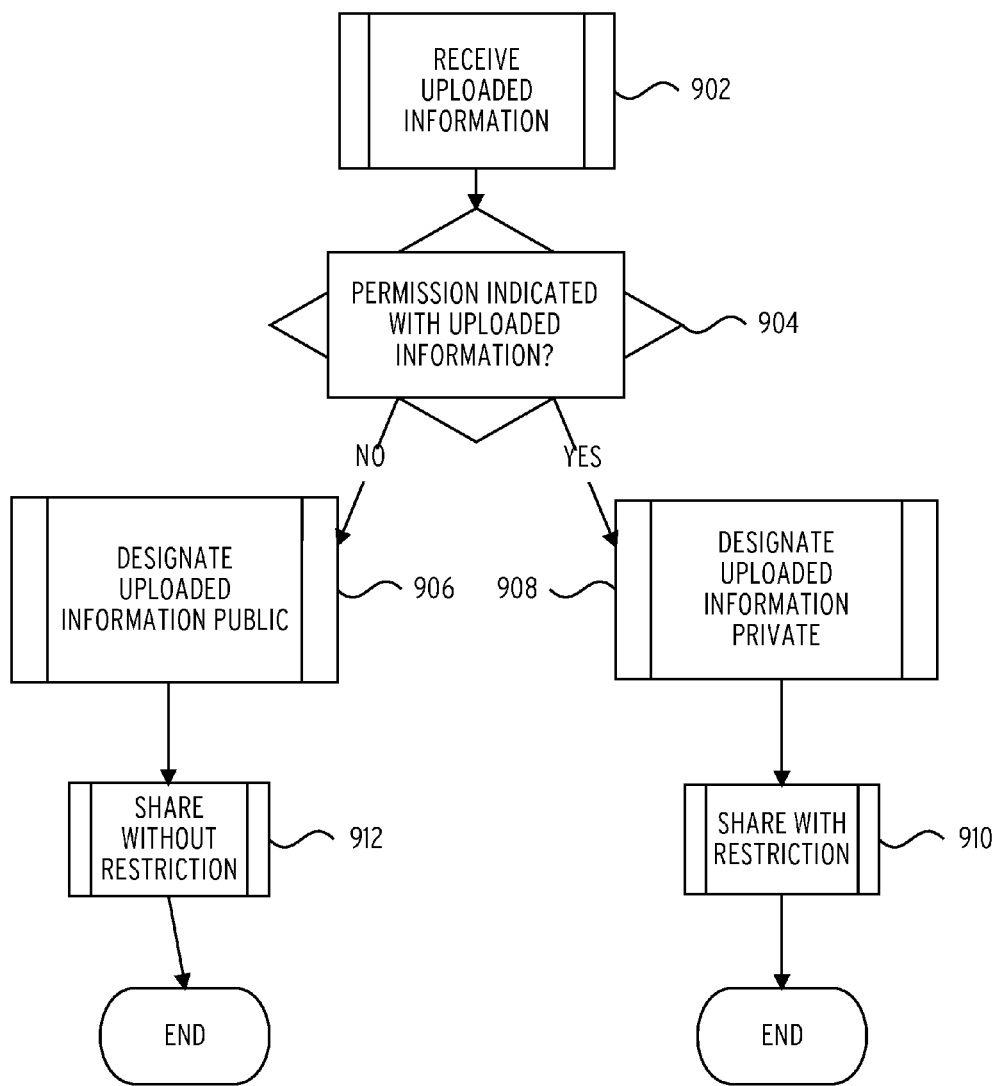
FIG. 9 illustrates a method for associating permissions with uploaded information, in accordance with one embodiment.

FIG. 9 illustrates a method for associating permissions with uploaded information, in accordance with one embodiment. As an option, the method may be carried out in the context of the details of any of the Figures disclosed herein. Of course, however, the method may be carried out in any desired environment. Further, any aforementioned definitions may equally apply to the description below.

As shown, uploaded information is received. See operation 902. Next, it is determined whether permissions are indicated with the uploaded information. See decision 904.

If it is determined that no permissions are indicated with the uploaded information, then the uploaded information is designated as public. See operation 906. Additionally, the uploaded information is then shared without restriction. See operation 908.

In an alternative embodiment, if permissions are not indicated with the uploaded information, then the uploaded information may automatically inherit global permissions associated with the user. For example, in one embodiment, a user may designate that all uploaded information may be kept private but shared freely with a list of preapproved users (e.g. family members, etc.). In other embodiments, a warehouse management facility may designate that all uploaded information may be kept private but may be shared freely with any employee associated with the management facility. In this manner, permissions may be inherited and/or set by the user and/or owner.

As shown, if permissions are indicated with the uploaded information, then the uploaded information is designated as private. See operation 910. Additionally, the uploaded information is shared with restriction. See operation 912.

In one embodiment, permissions may be set by the originating RFID tag. For example, in one embodiment, a first RFID tag may be associated with a user's wallet, whereas a second RFID tag may be associated with a remote control for the television. In such an embodiment, the first RFID tag may have a higher level of permission (i.e. only the wallet user may have access to the location, etc.), whereas the second RFID tag may have a lower level of permission so that other users may freely find where the remote control is located. In this manner, permissions may be associated with the RFID tag.

In other embodiments, permissions may be associated with a user, a company, a role, etc. In other embodiments, permissions may include a time limit (e.g. permission to view the location may expire after a set time period, etc.).

Figure 10:
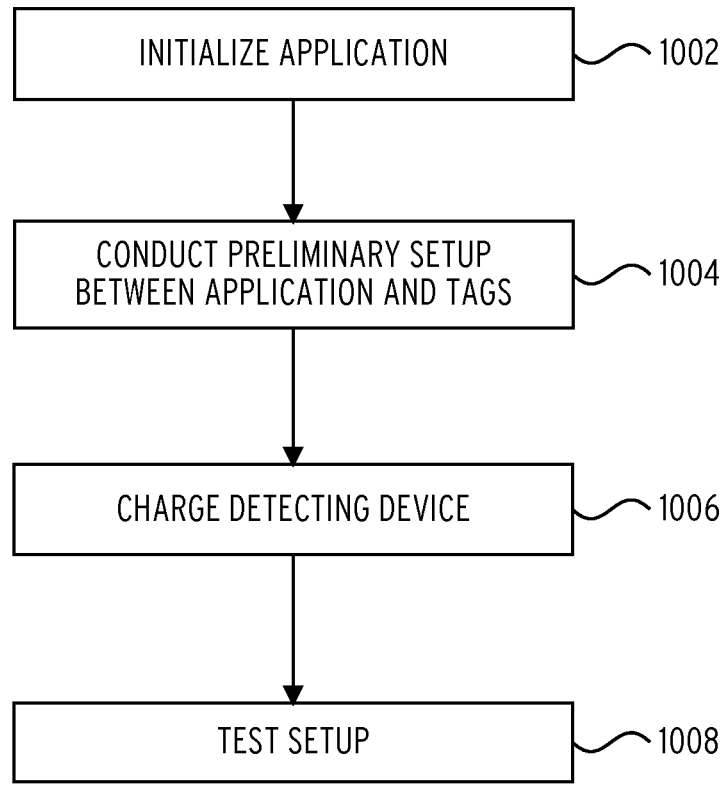
FIG. 10 is a method to setup a link between a tag and a device or application, in accordance with one embodiment.

FIG. 10 illustrates a method to setup a link between a tag and a device or application, in accordance with one embodiment. As an option, the method may be carried out in the context of the details of any of the Figures disclosed herein. Of course, however, the method may be carried out in any desired environment. Further, any aforementioned definitions may equally apply to the description below.

As shown, block 1002 includes initializing an application. In various embodiments, initializing an application may include downloading, transferring, and/or installing an application onto a mobile device and/or any other device capable of running the application.

Additionally, a preliminary setup is conducted between the application and tags. See block 1004. In operation, for example in one embodiment, a RFID tag may be attached to an object (e.g. a purse, etc.), and a picture of the purse may be taken using the application on the mobile device. Additionally, identification information (e.g. ID number, name, etc.) of the object may be inputted into the application. Further, an initial video and audio may be recorded as part of the preliminary setup. Of course, in other embodiments, such a setup procedure may be replicated for any number of items.

Next, a detecting device is charged. See block 1006. For example, in one embodiment, detecting device may include a bracelet, a broach, a watch, etc. As discussed herein, such a detecting device may be wirelessly charged.

Lastly, the setup is tested. Block 1008. In operation, the setup may be tested by taking an object that includes an RFID tag (e.g. a purse, etc.) in a first location (e.g. first bedroom, etc.), and moving the detecting device to a second location (e.g. second bedroom, etc.). Once the application is opened on the mobile device, the most recently taken video and audio may be obtained from the detecting device and displayed on the application on the mobile device. In such an embodiment, the user may be able to see (e.g. the first bedroom environment, etc.) and hear the audio (e.g. audio in the room, etc.) associated with the desired object (e.g. the purse, etc.).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A wearable device, comprising:
a non-transitory memory storing instructions; and
one or more processors in communication with the non-transitory memory, wherein the one or more processors execute the instructions to:
determine whether there are any RFID tags within a set range of a transceiver;
if at least one RFID tag is determined, query the at least one RFID tag;
identify each of the at least one RFID tag;
save the identification of the at least one RFID tag;
determine that the RFID tag is no longer in a sensing zone, wherein the determination occurs at set time intervals;
select a first video camera, among a plurality of cameras, on the wearable device, wherein the first video camera is selected based on at least one of an accelerometer, a gyroscope, one or more proximity sensors, and one or more photodetector;
record a video, using the first video camera of the plurality of video cameras, of surroundings associated with the at least one RFID tag;
record an audio, using at least one microphone, of the surroundings associated with the at least one RFID tag;
save the video recording and the audio recording; and
provide access to view the saved identification, the saved video recording, and the saved audio recording;
wherein the wearable device is intended to be worn on a wrist or a head.

2. The wearable device of claim 1, further comprising two or more video cameras, and two or more microphones.

3. The wearable device of claim 2, wherein one video camera is selected among the two or more video cameras to record.

4. The wearable device of claim 2, wherein two video cameras are selected to record.

5. The wearable device of claim 1, further comprising recording, using at one audio input, sounds associated with an environment around the at least one RFID tag, saving the audio recording, and uploading the saved audio recording to a remote storage.

6. The wearable device of claim 1, further comprising uploading the saved video recording or saved audio recording to a remote storage, wherein the remote storage includes storage located online.

7. The wearable device of claim 6, wherein the uploading occurs automatically after the saved video recording or saved audio recording is completed.

8. The wearable device of claim 6, wherein the uploading occurs in response to a user request after the saved video recording or saved audio recording is completed.

9. The wearable device of claim 1, further comprising communicating with an external device, wherein the communicating includes receiving instruction from the external device to pair with the at least one RFID tag.

10. The wearable device of claim 9, wherein the communicating includes sending the saved identification or the saved video recording to the external device.

11. The wearable device of claim 1, wherein the time interval is once every three minutes.

12. The wearable device of claim 1, wherein the determination occurs based on GPS coordinates or cellular coordinates.

13. A computer-implemented method, comprising:
determining, using a processor on a wearable device, whether there are any RFID tags within a set range of a transceiver;
if at least one RFID tag is determined, querying the at least one RFID tag;
identifying each of the at least one RFID tag;
saving the identification of the at least one RFID tag;
determining that the RFID tag is no longer in a sensing zone, wherein the determining occurs at set time intervals;

selecting a first video camera, among a plurality of cameras, on the wearable device, wherein the first video camera is selected based on at least one of an accelerometer, a gyroscope, one or more proximity sensors, and one or more photodetector;

recording a video, using the first video camera of the plurality of video cameras, of surroundings associated with the at least one RFID tag;

recording an audio, using at least one microphone, of the surroundings associated with the at least one RFID tag;

saving the video recording and the audio recording; and providing access to view the saved identification, the saved video recording, and the saved audio recording;

wherein the wearable device is intended to be worn on a wrist or a head.

14. A computer program product comprising computer executable instructions stored on a non-transitory computer readable medium that when executed by a processor instruct the processor to:

determine, using a processor on a wearable device, whether there are any RFID tags within a set range of a transceiver;

if at least one RFID tag is determined, query the at least one RFID tag;

identify each of the at least one RFID tag;

save the identification of the at least one RFID tag;

determine that the RFID tag is no longer in a sensing zone, wherein the determinization occurs at set time intervals;

select a first video camera, among a plurality of cameras, on the wearable device, wherein the first video camera is selected based on at least one of an accelerometer, a gyroscope, one or more proximity sensors, and one or more photodetector;

record a video, using the first video camera of the plurality of video cameras, of surroundings associated with the at least one RFID tag;

record an audio, using at least one microphone, of the surroundings associated with the at least one RFID tag;

save the video recording and the audio recording; and provide access to view the saved identification, the saved video recording, and the saved audio recording;

wherein the wearable device is intended to be worn on a wrist or a head.

15. The wearable device of claim 1, wherein the one or more processors further execute the instructions to simultaneously record a second video, using a second video camera of the plurality of video cameras.

16. The wearable device of claim 1, wherein the first video camera is given priority, in comparison to the plurality of cameras, based on having a view with least obstruction.

17. The wearable device of claim 1, wherein the one or more processors further execute the instructions to, while recording the video, switching from the first video camera to a second video camera based on the second video camera having a view less obstructed than the first video camera.

18. The wearable device of claim 1, wherein the determination that the RFID is no longer in a sensing zone triggers the recording of the video using the first video camera.

19. The wearable device of claim 1, wherein the wearable device is one of a broach, a necklace, a watch, and a bracelet.

* * * * *